United States Patent [19]
Buer et al.

[11] Patent Number: 6,003,117
[45] Date of Patent: Dec. 14, 1999

[54] SECURE MEMORY MANAGEMENT UNIT WHICH UTILIZES A SYSTEM PROCESSOR TO PERFORM PAGE SWAPPING

[75] Inventors: Mark Leonard Buer, Chandler; Gregory Clayton Eslinger, Phoenix, both of Ariz.

[73] Assignee: VLSI Technology, Inc., San Jose, Calif.

[21] Appl. No.: 08/947,378

[22] Filed: Oct. 8, 1997

[51] Int. Cl.⁶ .................................................. G06F 12/00
[52] U.S. Cl. .............................................. 711/163; 380/4
[58] Field of Search .................... 380/4, 25; 711/163, 711/164

[56] References Cited

U.S. PATENT DOCUMENTS

| | | | |
|---|---|---|---|
| 4,847,902 | 7/1989 | Hampson | 380/4 |
| 5,214,697 | 5/1993 | Saito | 380/4 |
| 5,249,232 | 9/1993 | Erbes et al. | 380/49 |
| 5,825,878 | 10/1998 | Takahashi et al. | 380/4 |

*Primary Examiner*—Eddie P. Chan
*Assistant Examiner*—Kevin Verbrugge
*Attorney, Agent, or Firm*—Douglas L. Weller

[57] ABSTRACT

An integrated circuit accesses encrypted data stored in an external memory, the integrated circuit includes a main memory for storing decrypted data. A processor within the integrated circuit utilizes the decrypted data in the main memory. A soft secure memory management unit (SMMU), within the integrated circuit, monitors data accesses by the processor. The soft SMMU signals the processor when the processor attempts to access first data which is not within the decrypted data in the main memory but is within the encrypted data stored in the external memory. When the soft SMMU signals the processor, the processor oversees transfer of the first data from the external memory and oversees decryption of the first data.

19 Claims, 5 Drawing Sheets

SECURE MEMORY MANAGEMENT UNIT WHICH UTILIZES A SYSTEM PROCESSOR TO PERFORM PAGE SWAPPING

BACKGROUND

The present invention concerns memory management in a computer system designs and pertains particularly to a secure memory management unit which utilizes a system processor to perform page swapping.

In order to protect against theft or misuse, secure information within a computing system can be encrypted before being stored in the memory for the computing system. When a secure integrated circuit uses the secure information, the secure information is transferred to the integrated circuit and decrypted before being used. Secure information returned to the memory for the computing system is encrypted before being stored.

Typically, decryption and encryption is handled by a secure memory management unit (SMMU) on the integrated circuit. When a processor requires the use of a page of secure information, the secure memory management unit on the integrated circuit obtains the page of secure information, decrypts the page of secure information and places the data in a cache memory for access by the processor. The cache is typically implemented using static random access memory (SRAM).

If, in order to bring in the page of secure information, a "dirty" page of information needs to be swapped out to memory, the SMMU performs the swap out of the "dirty" page of information before the new page is placed in the cache. A "dirty" page of information is a page of information which has been written to while in the cache where the changes made have not been written out to the system memory. If the "dirty" page of information contains secure information, the SMMU first encrypts the page before swapping the page out to system memory. While performing page swapping the SMMU holds off the processor while pages are being swapped to and from the processor cache.

One problem with typical hardware implementations of an SMMU is that to implement the functionality of an SMMU requires a lot of gates and complexity. However, for each particular project, the requirements for an SMMU may change requiring significant redesign of the SMMU.

Additionally, for typical implementations of SMMUs, considerable design time is required to configure the SMMU and once the final implementation is reached, the configuration of the SMMU can no longer be changed. See, for example, the VLSI Part Number VMS 310 and VLSI Part Number VMS 320 both available from VLSI Technology, Inc., having a business address of 1109 McKay Drive, San Jose, Calif. 95131.

In order to lessen the amount of hardware used to implement an hardware SMMU, a hardware DMA can be added to the integrated circuit to detect a page miss by the processor. After detecting a page miss, the DMA holds off the processor until the DMA has loaded and decrypted the next page of information. This requires the DMA to sit in-line with the processor and the memory subsystem. The DMA hardware also has to move the data through the encryption core and into the cache memory space. Such an implementation requires special care to meet timing and memory bus requirements. See, for example, the VLSI Part Number VMS 310 and VLSI Part Number VMS 320 both available from VLSI Technology, Inc.

SUMMARY OF THE INVENTION

In accordance with the preferred embodiment of the present invention, an integrated circuit accesses encrypted data stored in an external memory, the integrated circuit includes a main memory for storing decrypted data. A processor within the integrated circuit utilizes the decrypted data in the main memory. A soft secure memory management unit (SMMU), within the integrated circuit, monitors data accesses by the processor. The soft SMMU signals the processor when the processor attempts to access first data which is not within the decrypted data in the main memory but is within the encrypted data stored in the external memory. When the soft SMMU signals the processor, the processor oversees transfer of the first data from the external memory and oversees decryption of the first data.

In the preferred embodiment, the soft SMMU includes limit registers which indicate where in the external memory the encrypted data is stored. A comparison circuit determines whether an address of the first data is within a range specified by the limit registers. The soft SMMU also includes current page information registers which indicate information about pages of data stored in the main memory. Additional comparison circuits determine whether an address of the first data is within the pages of data stored in the main memory.

In the preferred embodiment, when second data needs to swapped back from the main memory to the external memory, the processor oversees encryption of the second data and oversees transfer of the second data to the external memory. In the preferred embodiment, the processor uses an encryption engine which to decrypt the first data and encrypt the second data. For example, the encryption engine performs a DES encrypt operation to decrypt the first data. Likewise, the encryption engine performs a DES decrypt operation to encrypt the second data. Alternatively, other encryption/decryption algorithms may be used.

Also in the preferred embodiment, a memory controller is used to access unencrypted data stored in the external memory.

The present invention provides an SMMU whose functionality is shared between dedicated hardware and software processes run by the system processor. This design of the SMMU reduces gate complexity of the integrated circuit while increasing the flexibility of operation of the SMMU.

DESCRIPTION OF THE PREFERRED EMBODIMENT

Figure 1:
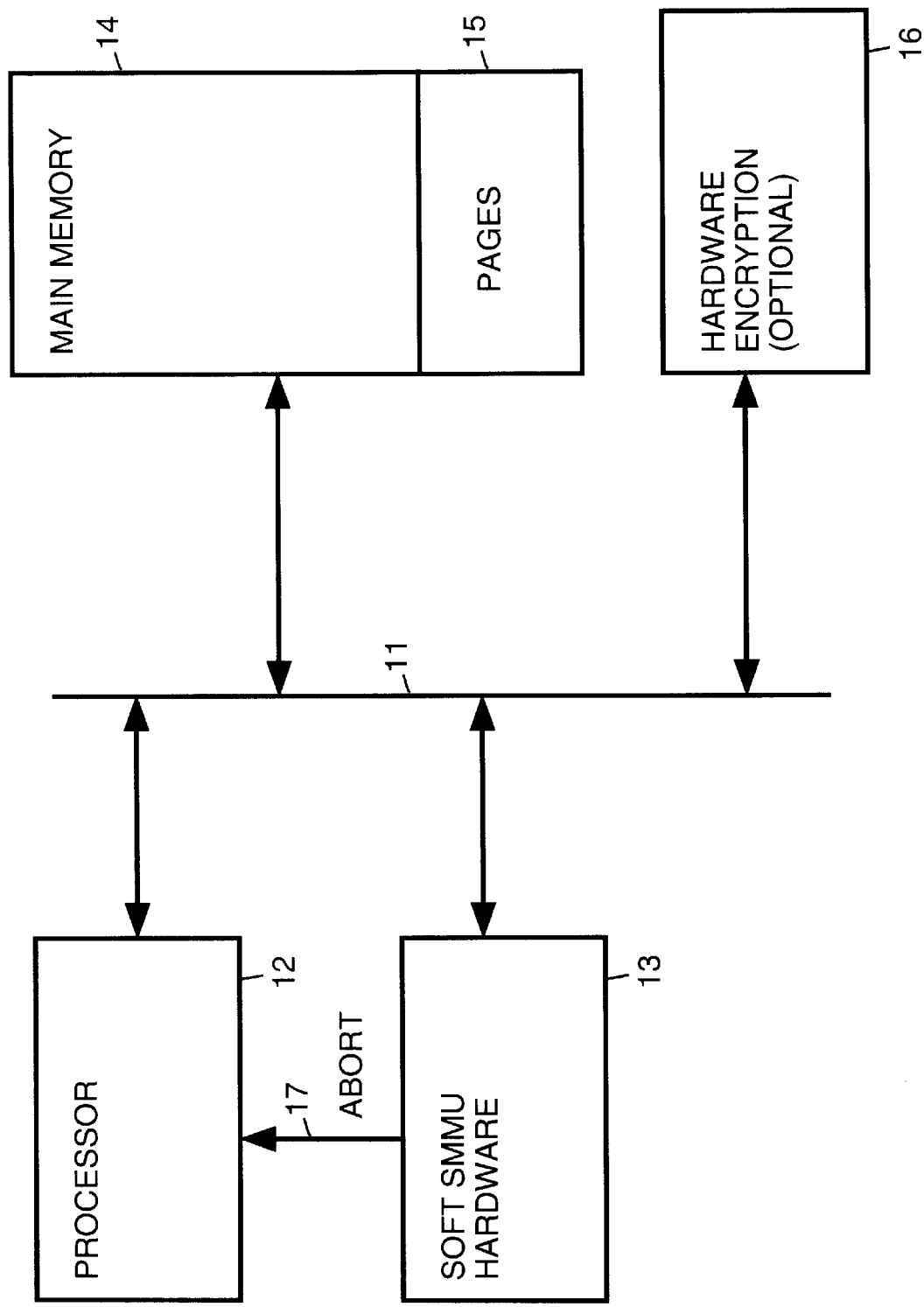
FIG. 1 is a simplified block diagram of an integrated circuit which includes a soft secure memory management unit in accordance with the preferred embodiment of the present invention.

FIG. 1 is a simplified block diagram of an integrated circuit which includes a system processor 12, a soft secure memory management unit (SMMU) 13 and a main memory 14 connected to a processor bus 11. For example, processor 11 is an ARM7TDMI processor or another processor that may be included on an integrated circuit. Main memory 14 is, for example, implemented as a static random access memory (SRAM). A hardware encryption core 16 may be included. Alternatively, encryption/decryption may be performed by system processor 12. For example, encryption and decryption is performed in accordance with the Data Encryption Standard (DES). See for example, *Data Encryption Standard (DES)*, Federal Information Processing Standards Publication (FIPS PUB) 46-2, Dec. 30, 1993 available from the U.S. Department of Commerce, Technology Administration, National Institute of Standards and Technology. See also *DES Modes of Operation*, Federal Information Processing Standards Publication (FIPS PUB) 81, Dec. 2, 1980 available from the U.S. Department of Commerce, National Bureau of Standards. Alternatively, some other encryption/decryption algorithm may be used.

Soft SMMU 13 takes advantage of system processor 12 to handle page allocation and data movement for page updates. Functionality of soft SMMU 13 is reduced to maintaining page information and triggering an abort of the memory cycle on a page miss. System processor 12 can interrupt the abort as a page miss and update the page registers in the soft SMMU 13. The new page can then be loaded and decrypted by system processor 12. This allows great flexibility in the determination of multiple pages, write back capability, or locking pages that are used often. As mentioned above, hardware encryption core 16 is not required for low end applications or for simple encryption methods. For these case an encryption/decryption algorithm can be resident on system processor 12.

In the preferred embodiment, the hardware within soft SMMU 13 is page modular. The timing requirements are greatly reduced since soft SMMU 13 only compares an address received on an external bus to the page boundaries in the page registers within soft SMMU 13. Soft SMMU 13 can abort the cycle at the end of the memory transaction, therefore soft SMMU 13 does not have to make a comparison at the beginning of the cycle. Since data is moved by system processor 12, there are no special DMA ports or DMA busses that are necessary. System processor 13 can move the data on the memory bus 11.

The pages that are cached by system processor 12 can be stored as pages 15 in main memory 14, which serves as scratch memory space for processor 12. Soft SMMU 13 is a simple peripheral attached to processor bus 11.

Soft SMMU 13 monitors address requested by system processor 12 for an instruction or data operation that is within the page limits of secure information stored in an external system memory. The external system memory is external to the integrated circuit. Limit registers within soft SMMU 13 indicate the page limits of secure information stored in the external system memory. If the data requested by system processor 12 is within the page limits of secure information stored in the external system memory but is not located on a page that is currently held in main memory 14, soft SMMU 13 will abort the operation using an abort line 17.

Figure 2:
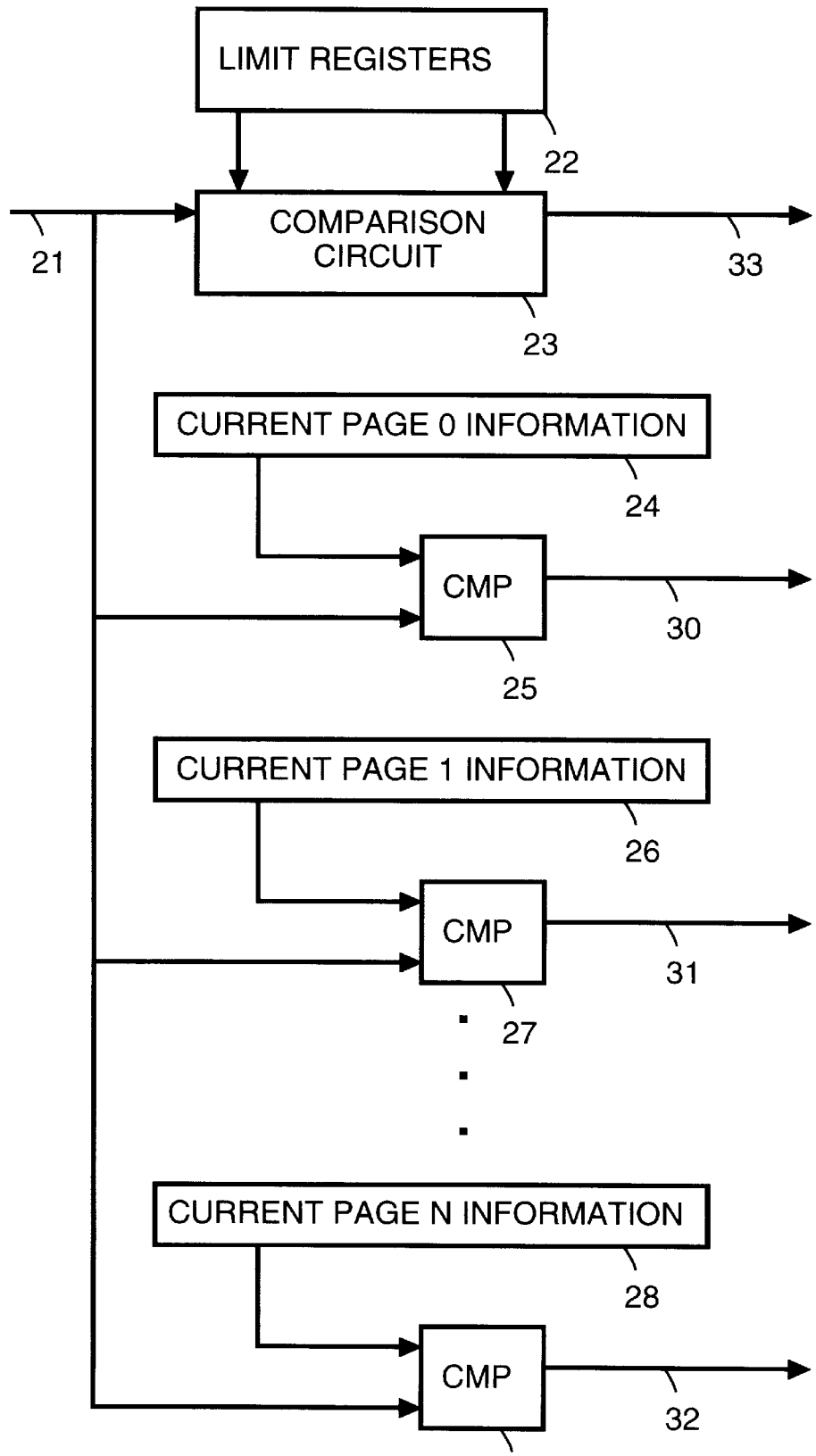
FIG. 2 is a simplified block diagram of the soft secure memory management unit shown in FIG. 1 in accordance with the preferred embodiment of the present invention.

FIG. 2 is a simplified block diagram of soft SMMU 13. Limit registers 22 store page limits for secure information within an external system memory external to the integrated circuit. A comparison circuit 23 compares the page limits in limit registers 22 with an address on address lines 21 of processor bus 11. When the address on address lines 21 is within the page limits in limit registers 22, a WITHIN flag on a line 33 is asserted true.

Registers 24 contain information (e.g., start address and page size) of a "page 0" of data stored in pages 15 of main memory 14. A comparison circuit 25 compares the information in registers 24 with the address on address lines 21 of processor bus 11 to determine whether the address on address lines 21 addresses data stored in "page 0" of data stored in pages 15 of main memory 14. When the address on address lines 21 addresses data stored in "page 0" of data stored in pages 15, an "EQ0" flag on a line 30 is asserted true Registers 26 contain information (e.g., start address and page size) of a "page 1" of data stored in pages 15 of main memory 14. A comparison circuit 27 compares the information in registers 26 with the address on address lines 21 of processor bus 11 to determine whether the address on address lines 21 addresses data stored in "page 1" of data stored in pages 15 of main memory 14. When the address on address lines 21 addresses data stored in "page 1" of data stored in pages 15, an "EQ1" flag on a line 31 is asserted true.

For every page in pages 15, soft SMMU 13 contains similar circuitry. For example, registers 28 contain information (e.g., start address and page size) of a "page N" of data stored in pages 15 of main memory 14. A comparison circuit 29 compares the information in registers 28 with the address on address lines 21 of processor bus 11 to determine whether the address on address lines 21 addresses data stored in "page N" of data stored in pages 15 of main memory 14. When the address on address lines 21 addresses data stored in "page N" of data stored in pages 15, an "EQN" flag on a line 32 is asserted true.

Limit registers 22 and registers 24, 26 and 28 can be accessed by processor 12. This allows for great flexibility in configuring the external memory, main memory 14 and the page size of individual pages.

For a page access, soft SMMU 13 determines there is a HIT when the address on address lines 21 results in, for a page X, the EQ flag being asserted (EQX) and the page being enabled (ENABLEX). Thus there is a HIT on page 0 for EQ0 AND ENABLE0. There is a HIT on page 1 for EQ1 AND ENABLE1. There is a HIT on page N for EQN AND ENABLEN.

The address on address lines 21 is used to access a value within pages 15 of main memory 14, when there is a fetch command and the address on address lines 21 results in a HIT and the WITHIN flag on a line 33 is asserted true.

Soft SMMU 13 detects a miss when there is a fetch command and the address on address lines 21 does not result in a HIT and the WITHIN flag on a line 33 is asserted true. In this case, the desired page needs to be swapped in from the external system memory and decrypted. If necessary a page is swapped out of main memory 14 to make room for the new page.

When soft SMMU 13 detects a fetch command, the address on address lines 21 results in a HIT and the WITHIN flag on a line 33 is not asserted true, then the memory transaction does not involve secure information.

The last used page is determined by latching the EQ0 through EQN values.

System processor 12 is the engine which performs necessary SMMU operations to allow encrypted data external to the integrated circuit to be utilized by system processor 12. In a preferred embodiment, processor performs encryption and decryption using encryption engine 40. Alternatively, as discussed above, system processor 12 can perform encryption and decryption using software algorithms.

Also, in the preferred embodiment, encryption engine 40 encrypts data using a DES decrypt operation. Similarly, encryption engine 40 decrypts data using a DES encrypt operation. The reason this is done is because the DES decrypt process is self correcting if there is an error. If somehow the data does get corrupted in the external system memory the error should not be corrected when using the SMMU processes to page the data. In the discussion below, the decryption of data will be described as a decryption operation (even though in the preferred embodiment the decryption is actually performed using a DES encrypt). Likewise, in the discussion below, the encryption of data will be described as an encryption operation (even though in the preferred embodiment the encryption is actually performed using a DES decrypt).

Two main states of system processor 12 are used for SMMU processing: SMMU BOOT/INITIALIZATION STATE, and SMMU ABORT PAGING STATE.

System processor 12 enters SMMU BOOT/INITIALIZATION STATE anytime integrated circuit gets a reset. The purpose of this state is to test the functionality of soft SMMU 13 and verify the first page of instructions to be executed can be decrypted correctly before being executed by system processor 12. In the /INITIALIZATION STATE, system processor 12 will setup the decrypt operation, read in the first page, verify the first page is valid and jump to the first instruction of the first page.

Table 1 below gives pseudo code executed by system processor 12 in SMMU BOOT/INITIALIZATION STATE.

TABLE 1

Load in the initial DES SMMU key from one time programmable
   memory;
Set Up decryption (DES encrypt operation) for an incoming page;
Load in the initial page from external memory;
Perform a checksum on this first page;
if checksum does not pass then
   Error-halt the processor;
else
   enable the SMMU processing;
   Jump to the first address of the first page (Normal execution);
endif.

System processor 12 enters the SMMU ABORT state anytime a page miss is detected (i.e., upon receiving an abort signal on abort line 17). The purpose of SMMU ABORT state is to handle the page miss and read in the new page. In SMMU ABORT state, system processor 12 determines the next page to use. If an existing page needs to be written back to system (external) memory, system processor 12 sets up encryption engine 40 to perform an encryption operation, and then downloads the encrypted page to the external system memory. System processor than sets up encryption engine 40 to decrypt the incoming page, and uploads the external memory page to be decrypted and placed in pages 15 of main memory 14. System processor 12 then returns to execution of the interrupted instruction.

Table 2 below gives pseudo code executed by system processor 12 in the SMMU ABORT PAGING STATE.

TABLE 2

Determine the next page (in pages 15) to use (next_page);
save the DES context (e.g. the DES parameters, mode/status/iv);
setup the DES to perform SMMU operations;
if ( the current_page (currently residing in pages 15 which is to be
  replaced by next_page) has data in it that should be written back) then
   save the current_page value;
   Setup for encryption (using DES decrypt operation)
   - a page is composed of 1, 2, 4 or 8 blocks of 64 words
   - writeback the values of the current_page;
   for (i = 0, i <= page_blk_size, i++)
     Set the IV for the current page;
     Encrypt (using DES decrypt operation) each word for this 64 word
       block and write the encrypted word to its respective external
       memory location;
   end-for;
   clear the write back bit for the page location in pages 15;
   restore the current_page value;
end-if;
disable the next_page;
change the base_addr for next_page
Setup for decryption (using DES encrypt operation)
- a page is composed of 1, 2, 4 or 8 blocks of 64 words
- Page in the new data;
for (1 = 0, i <= page_blk_size, i++)
  Set the IV for the current page
  Decrypt (using DES encrypt operation) each word for this 64 word
    block and write the decrypted word to its respective external memory
    location;
end-for;
restore DES context;
disable interrupts;
enable the page;
clear the page Hit signal;
calculate the new link register value;
enable interrupts;
return to the aborted instruction.

Figure 3:
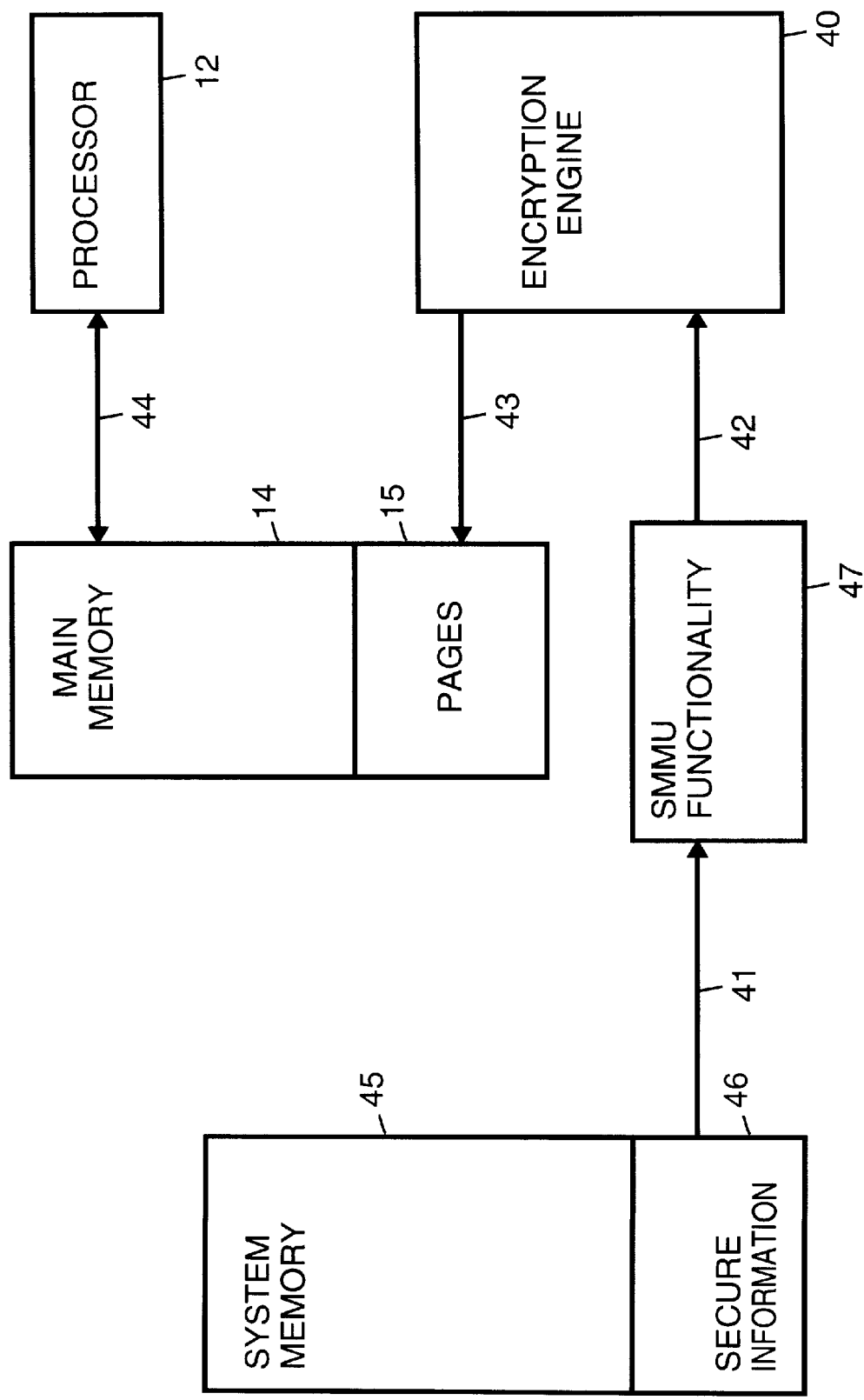
FIG. 3 is a simplified block diagram which shows data flow of secure information from an external system memory into cache memory within the integrated circuit shown in FIG. 1 in accordance with the preferred embodiment of the present invention.

FIG. 3 is a simplified block diagram which shows data flow of secure information from an external system memory 45 into a cache memory (pages 15 of main memory 14) for system processor 12. A page of information from secure information 46 of external system memory 45 is received by an SMMU function 47 of the integrated circuit. For example, the page of information contains secure instructions to be executed, or secure data to be used, by system processor 12. As discussed above, SMMU function 47 is implemented by soft SMMU hardware 13 and SMMU processes running on system processor 12.

SMMU function 47 uses encryption engine 40 (or algorithms run by system processor 12) to decrypt the page of secure information, and places the decrypted information within pages 15 of main memory 14. Processor 12 can then access the decrypted information.

Figure 4:
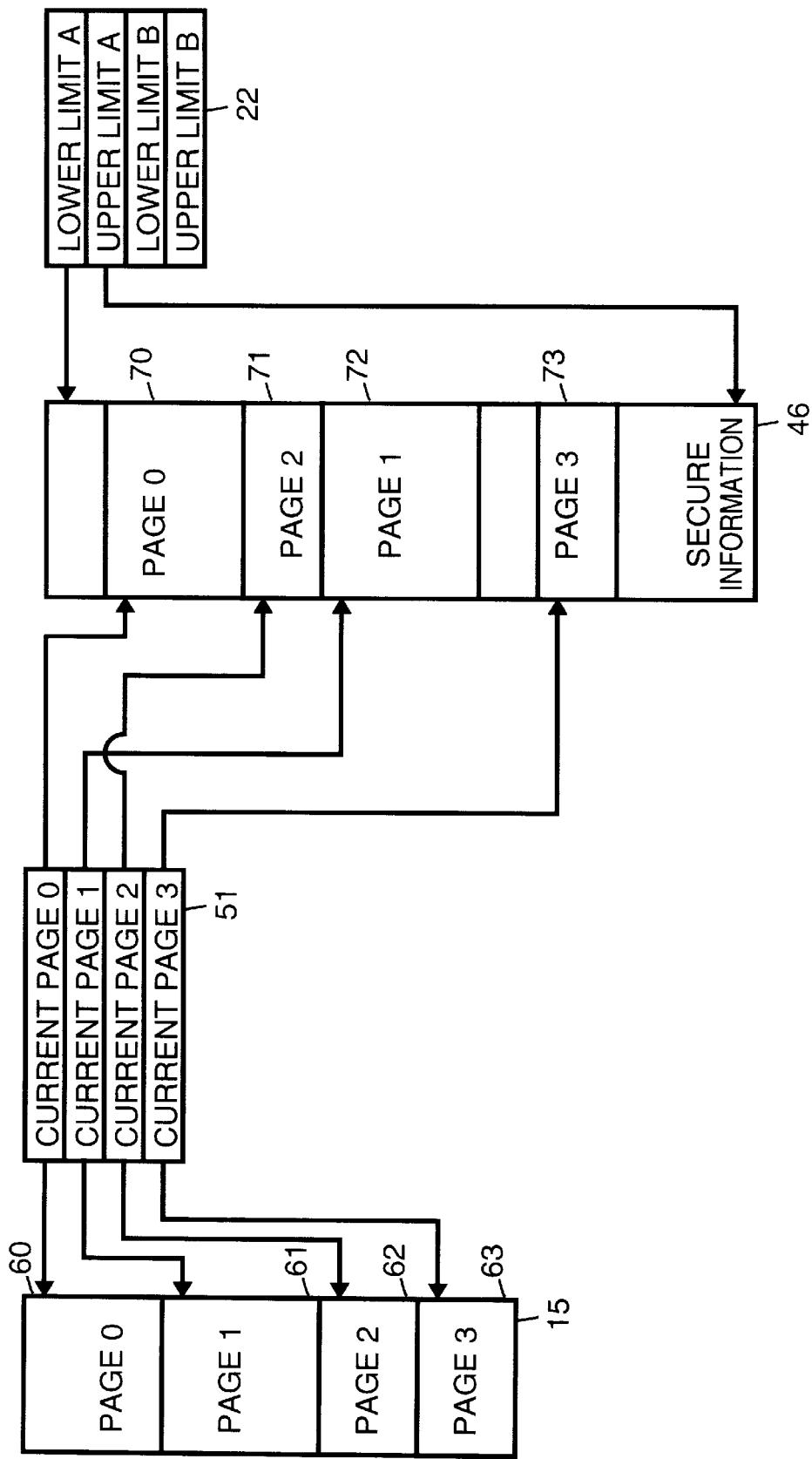
FIG. 4 illustrates usage of registers within the soft secure memory management unit shown in FIG. 1 in accordance with the preferred embodiment of the present invention.

FIG. 4 shows usage of registers within soft SMMU 13. Limit registers 22 store page limits for secure information within secure information 46 of external system memory 45 system. For example, limit registers 22 include a register which contains a lower limit to a section A and an upper limit to section A of secure information 46, as shown in FIG. 4. Limits for additional segments also may be stored in limit registers 22, as illustrated by the register which contains a lower limit to a section B and the register which contains an upper limit to section B.

Current page information registers 51 identify addresses of pages currently in pages 15 of main memory 14. These pages, as needed, are moved back and forth from secure information 46 of external system memory 45 system, as described above. Use of current page information registers 51 is described more fully above in the discussion of registers 24, 26 and 28 shown in FIG. 2.

Figure 5:
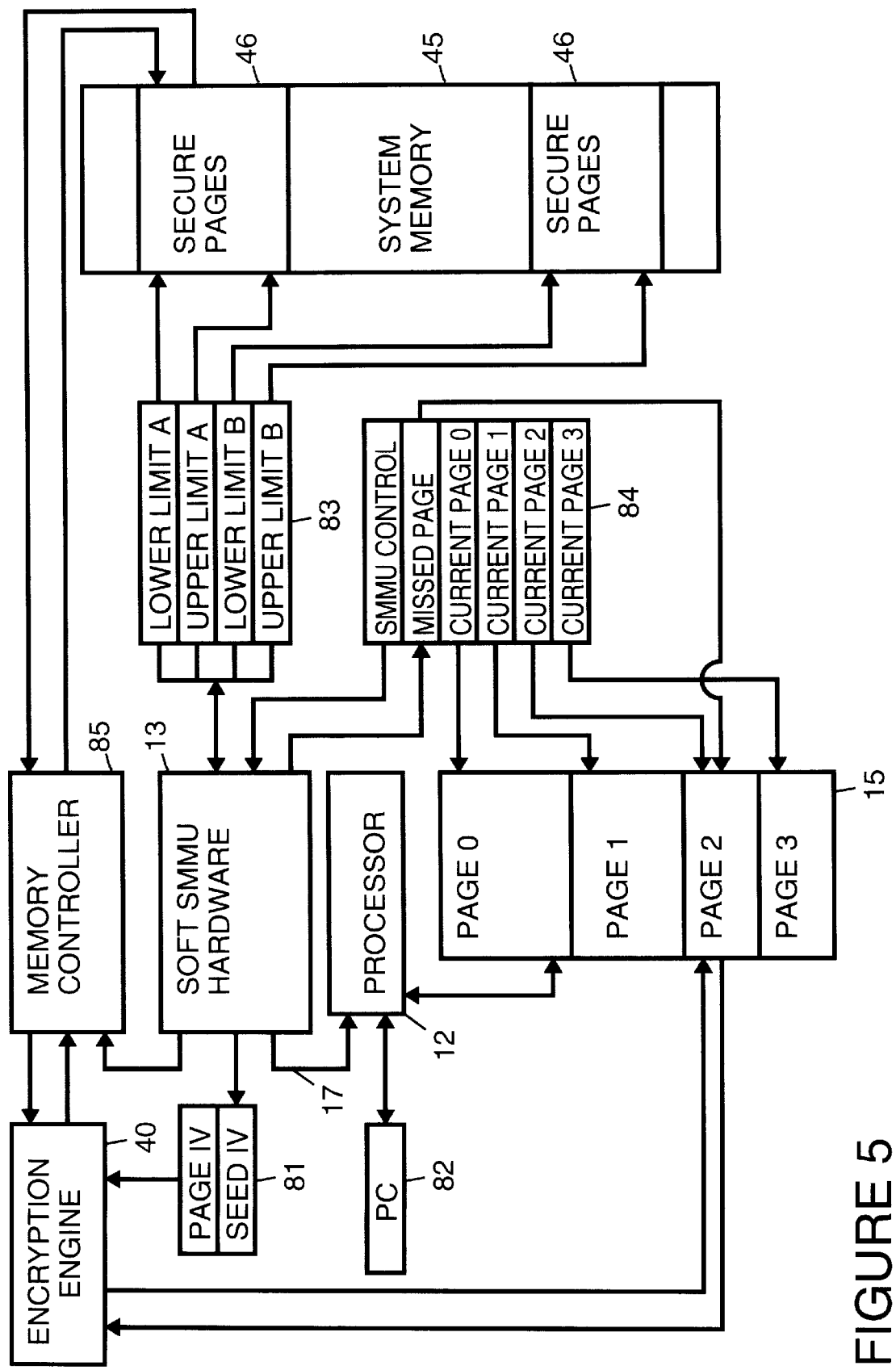
FIG. 5 is a simplified block diagram which illustrates data flow for a data miss within the integrated circuit shown in FIG. 1 in accordance with the preferred embodiment of the present invention.

FIG. 5 illustrates what happens when a page miss occurs. A page miss is initiated when a program counter 82 for system processor 12 encounters an address which is not currently in main memory (SRAM) 14. Soft SMMU hardware 13 detects this as described above. Upon detection, soft SMMU 13 signals processor 12 on abort line 17. The SMMU process then takes control. If the requested address is within either the A or B limits (as set out in limit registers 22), the SMMU process claims the address and begins the process of fetching the page. Otherwise, the SMMU process will not claim the address and instead will allow a memory controller 85 to fetch the data.

Once the SMMU process claims the address (that is soft SMMU 13 has asserted the abort signal on abort line 17) a series of events occur as described above. The SMMU process writes a page back from pages 15, if necessary, and determines which of pages 15 to replace and computes the Page IV in registers 81. Page IV and seed 14 are specific to DES encryption. Page IV is used in coordination with seed IV to create a unique startup value for each 64 word block. The method for determining the page to swap is as follows:

Next Page=(Last hit Page+1) mod 4

Last hit page is the page which was most recently hit. Hence the algorithm is cyclic in that it simply picks the next page in sequence.

The external page from secure pages 46 in external system memory 45 is loaded into the input registers of encryption engine 40 and decryption begins. The output registers of encryption engine 40 are then moved into the appropriate page within pages 15 of main memory 14. The SMMU process will also update the missed page register which indicates which page was most recently swapped. Once the page has been loaded into pages 15, the SMMU process re-enables normal processing of processor 12.

A write back occurs if two conditions are met: the external memory limit range is write back enabled and the page being swapped out has changed. Only external system memory 45 is write back enabled, not pages 15 of main memory 14.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. An integrated circuit which accesses encrypted data stored in an external memory, the integrated circuit comprising:

a main memory for storing decrypted data;

a processor which utilizes the decrypted data in the main memory; and, a soft secure memory management unit (SMMU), the soft SMMU monitoring data accesses by the processor and signaling the processor when the processor attempts to access first data which is not within the decrypted data in the main memory but is within the encrypted data stored in the external memory;

wherein when the soft SMMU signals the processor, the processor oversees transfer of the first data from the external memory and oversees decryption of the first data.

2. An integrated circuit as in claim 1 wherein the soft SMMU comprises:

limit registers which indicate where in the external memory the encrypted data is stored; and, current page information registers which indicate information about pages of data stored in the main memory.

3. An integrated circuit as in claim 2 wherein the soft SMMU additionally comprises:

first comparison means for determining whether an address of the first data is within a range specified by the limit registers.

4. An integrated circuit as in claim 2 wherein the soft SMMU additionally comprises:

hit comparison means for determining whether an address of the first data is within the pages of data stored in the main memory.

5. An integrated circuit as in claim 1 wherein the integrated circuit includes an encryption engine which the processor uses to decrypt the first data.

6. An encryption circuit as in claim 5 wherein the encryption engine performs a DES encrypt operation to decrypt the first data.

7. An integrated circuit as in claim 1 when second data needs to swapped back from the main memory to the external memory, the processor oversees encryption of the second data and oversees transfer of the second data to the external memory.

8. An integrated circuit as in claim 7 wherein the integrated circuit includes an encryption engine which the processor uses to encrypt the second data.

9. An encryption circuit as in claim 8 wherein the encryption engine performs a DES decrypt operation to encrypt the second data.

10. An integrated circuit as in claim 1 additionally comprising a memory controller used to access unencrypted data stored in the external memory.

11. A method by which an integrated circuit accesses encrypted data stored in an external memory, the method comprising the following steps:

(a) storing decrypted data in a main memory within the integrated circuit;

(b) utilizing the decrypted data in the main memory by a processor; and, (c) monitoring, by a soft secure memory management unit (SMMU), data accesses made by the processor;

(d) signaling the processor by the soft SMMU, when the processor attempts to access first data which is not within the decrypted data in the main memory but is within the encrypted data stored in the external memory; and, (e) performing, by the processor, the following substeps when in step (d) the soft SMMU signals the processor, (e.1) overseeing transfer of the first data from the external memory, and (e.2) overseeing decryption of the first data.

12. A method as in claim 11 wherein step (c) includes the following substep:

(c.1) comparing, by the soft SMMU, an address of the first data to determine whether the address is within a range specified by limit registers.

13. A method as in claim 11 wherein step (c) includes the following substep:

(c.1) comparing, by the soft SMMU, an address of the first data within current page information registers to determine whether the first data is within the pages of data stored in the main memory.

14. A method as in claim 11 wherein substep (e.1) includes the following substep:

using an encryption engine, overseen by the processor, to decrypt the first data.

15. A method as in claim 11 wherein in substep (e.1) the encryption engine performs a DES encrypt operation to decrypt the first data.

16. A method as in claim 11 wherein step (e) includes the following substeps performed before substep (e.1) when in step (d) the soft SMMU signals the processor:

(e.3) overseeing, by the processor, encryption of the second data; and, (e.4) overseeing, by the processor, transfer of the second data to the external memory.

17. A method as in claim 16 wherein substep (e.3) includes the following substep:

using an encryption engine, overseen by the processor, to encrypt the second data.

18. A method as in claim 17 wherein in substep (e.3) the encryption engine performs a DES decrypt operation to encrypt the second data.

19. A method as in claim 11 additionally comprising the following step:

(f) accessing unencrypted data stored in the external memory using a memory controller within the integrated circuit.

* * * * *